United States Patent
Jeong et al.

(10) Patent No.: US 10,409,815 B2
(45) Date of Patent: Sep. 10, 2019

(54) SQLSCRIPT COMPILATION TRACING SYSTEM

(71) Applicant: SAP SE, Walldorf (DE)

(72) Inventors: Chanho Jeong, Seoul (KR); Jaeha Lee, Seoul (KR)

(73) Assignee: SAP SE, Walldorf (DE)

(*) Notice: Subject to any disclaimer, the term of this patent is extended or adjusted under 35 U.S.C. 154(b) by 218 days.

(21) Appl. No.: 15/622,495

(22) Filed: Jun. 14, 2017

(65) Prior Publication Data

US 2018/0246931 A1 Aug. 30, 2018

Related U.S. Application Data

(60) Provisional application No. 62/463,809, filed on Feb. 27, 2017.

(51) Int. Cl.
*G06F 16/2453* (2019.01)
*G06F 8/41* (2018.01)
(Continued)

(52) U.S. Cl.
CPC ........ *G06F 16/24544* (2019.01); *G06F 8/427* (2013.01); *G06F 9/45512* (2013.01); *G06F 16/24524* (2019.01); *G06F 16/9024* (2019.01)

(58) Field of Classification Search
CPC .............. G06F 11/3636; G06F 11/364; G06F 11/3608; G06F 11/3656; G06F 11/3664;
(Continued)

(56) References Cited

U.S. PATENT DOCUMENTS

| | | | |
|---|---|---|---|
| 2007/0214171 A1* | 9/2007 | Behnen | G06F 8/10 |
| 2012/0079246 A1* | 3/2012 | Breternitz, Jr. | G06F 9/30072 712/208 |
| 2017/0255673 A1* | 9/2017 | Li | G06F 16/24542 |

\* cited by examiner

*Primary Examiner* — Robert W Beausoliel, Jr.
*Assistant Examiner* — Hau Hoang
(74) *Attorney, Agent, or Firm* — Buckley, Maschoff & Talwalkar LLC

(57) ABSTRACT

A system comprises generation of a parse tree comprising a plurality of query parse nodes, each of the plurality of query parse nodes corresponding to a respective one of a plurality of portions of a script definition, generation of a first intermediate representation tree comprising an intermediate representation node corresponding to a respective one of each of the plurality of query parse nodes, wherein an intermediate representation node represents a logical operation corresponding to the portion of the script definition of the query parse node which corresponds to the intermediate representation node, definition of links between each of the plurality of query parse nodes and its corresponding the intermediate representation node, determination of a second intermediate representation tree, the second intermediate representation tree resulting from an optimizer transformation executed on the first intermediate representation tree, generation of an intermediate representation node corresponding to a transformed first one or more of the intermediate representation nodes of the first intermediate representation tree, definition of links associating the intermediate representation node corresponding to the transformed first one or more of the intermediate representation nodes with the transformed first one or more of the intermediate representation nodes of the first intermediate representation tree, generation of a script execution graph of script execution nodes, each of the script execution nodes corresponding to a second one or more nodes of the second intermediate representation tree, definition of links associating each of the
(Continued)

script execution nodes with its corresponding second one or more of the intermediate representation nodes, generation of a graph comprising the plurality of query parse nodes, the intermediate representation nodes, the script execution nodes and the links, and presentation of the graph.

20 Claims, 13 Drawing Sheets

(51) Int. Cl.
*G06F 16/2452* (2019.01)
*G06F 9/455* (2018.01)
*G06F 16/901* (2019.01)

(58) Field of Classification Search
CPC .......... G06F 16/2453; G06F 16/24544; G06F 16/24524; G06F 16/9024; G06F 8/427; G06F 9/45512
See application file for complete search history.

SQLSCRIPT COMPILATION TRACING SYSTEM

CROSS-REFERENCE TO RELATED APPLICATIONS

This application is related to, and claims benefit of and priority to, U.S. Provisional Patent Application No. 62/463,809, filed Feb. 27, 2017, the contents of which are hereby incorporated by reference in their entirety for all purposes.

BACKGROUND

In conventional database systems, user-written design-time objects (e.g., queries or procedures) are optimized by a compiler to create an execution plan for an underlying execution engine and corresponding database hardware. For example, optimization of design-time objects written in a procedural language such as SQLScript includes techniques such as SQL statement inlining, dead code elimination, and control flow simplification. These optimizations often result in an execution plan which bears little resemblance to the design-time objects from which it was generated.

More specifically, the transformations which occur during optimization obscure associations between elements of the optimized execution plan and elements of the design-time objects from which the execution plan was generated. This limits the ability of end-users or database engine developers to identify elements of the design-time objects which should be modified to address performance or functionality issues. It is therefore desirable to improve the ability to understand correspondences between design-time objects and elements of an execution plan generated therefrom.

DETAILED DESCRIPTION

The following description is provided to enable any person in the art to make and use the described embodiments. Various modifications, however, will remain apparent to those in the art.

Briefly, according to some embodiments, a graph is generated which illustrates each delta transformation which occurs during compilation of a query or procedure. Such a graph may facilitate the identification of correlations between design-time objects and execution-time issues, and may be utilized for plan analysis, error tracing, monitoring, etc. Embodiments are not limited to any particular types of query, procedure, or compiler thereof.

Figure 1:
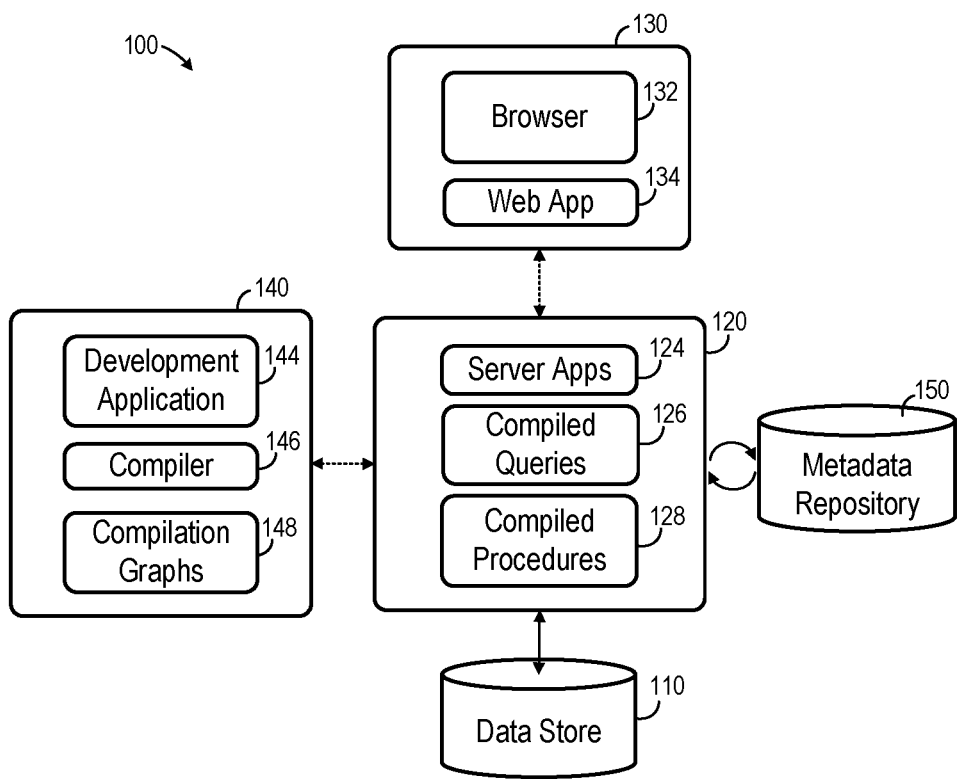
FIG. 1 is a block diagram of a system architecture according to some embodiments.

FIG. 1 is a block diagram of architecture 100 according to some embodiments. Embodiments are not limited to architecture 100 or to a database architecture. Architecture 100 includes data store 110, application platform 120, client system 130, developer system 140 and metadata repository 150. Generally, application platform 120 receives requests from browser 132 executing on client system 130 and, in response, provides data to browser 132 based on data stored within data store 110. The functionality of application platform 120 is provided by server applications 124, compiled queries 126 and compiled procedures 128 executed therein.

Server applications 124, compiled queries 126 and compiled procedures 128 may comprise executable program code conforming to any language compatible with platform 120. According to some embodiments, applications 124, compiled queries 126 and compiled procedures 128 are executed to provide user interfaces to client system 130, receive requests via such user interfaces from client system 130, retrieve data from data store 110 based on the requests, process the data received from data store 110, and provide user interfaces including the processed data to client system 130.

Development system 140 may comprise any computing system, and may execute development application 144 to allow a developer to create design-time objects, including but not limited to application code, queries, and procedures. For example, a developer may operate development application 144 to create a procedure (e.g., an SQLScript program string) conforming to a scripting language. Compiler 146 may compile the script as described herein to generate a compiled procedure (i.e., a run-time object). As will be described below, compiler 146 may further generate a compilation graph associating elements of the design-time object with elements of the run-time object. The compilation graph may be stored within compilation graphs 148 and may be presented to the developer via development application 144 or another suitable visualization application (not shown).

Client system 130 may comprise a device executing program code of Web browser 132, which in turn, in some embodiments, executes Web application 134. Such execution allows interaction with applications 124 of application platform 120. In response, applications 124 may provide user interfaces to Web browser 132 (e.g., as HTML pages, as UI metadata describing controls conforming to a UI framework, etc.) based on the data of data store 110. Web application 134 renders the user interfaces, which may be used for reporting, data analysis, and/or any other functions.

Application platform 120 may be separated from or closely integrated with data store 110. Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Metadata repository 150 may store metadata defining the logical entities (e.g., relational database tables and their respective interrelating schemas) of data store 110. Metadata repository 150 may also store metadata defining objects which are mapped to logical entities of data store 110. Each object associates may one or more physical entities (e.g., a physical database table, associated columns of one or more database tables, etc.) of one or more enterprise data sources with user-friendly names. These objects may be classified as dimensions, along which one may want to perform an analysis or report (e.g., Year, Country, Product) or measures (e.g., Sales, Profit), whose values can be determined for a given combination of dimension values.

Figure 2:
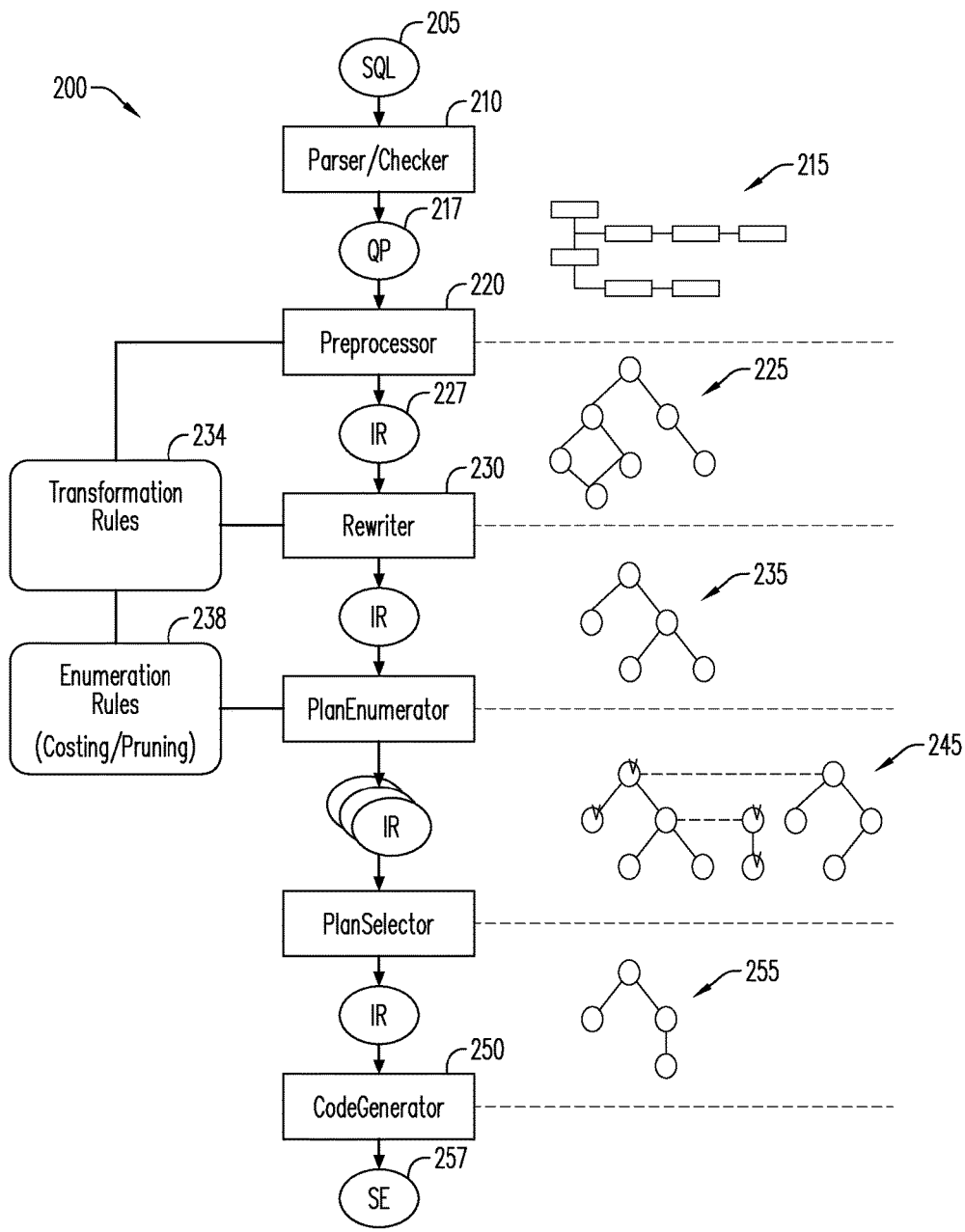
FIG. 2 is a diagram illustrating compiler operation according to some embodiments.

FIG. 2 illustrates the functional elements and operation of a compiler according to some embodiments. Compiler 200 is illustrated as an SQLScript compiler but embodiments are not limited thereto. SQLScript is a tool to implement the procedural extensions of SQL on a database system. SQLScript provides procedural language features such as control flow, multiple SQL statement, exception handling, variable assignment, efficient parallel execution and efficient data management using table variables.

SQL 205 represents a design-time object, for example, an SQLScript string written by a developer via development application 144. SQLScript Parser/Checker 210 subjects SQL 205 to syntactic analysis (i.e. parsing) and semantic analysis (i.e., checking) and translates SQL 205 into a query parse (QP) tree 215. Parse tree 215 consists of QP nodes, where the QP nodes represent each syntactic block of SQL 205 such as SELECT, Data Manipulation Language, Data Description Language, and imperative constructs (e.g., IF, ELSE, WHILE, and EXIT HANDLER). Moreover, each QP node 217 contains the line number and column position number of the original SQLScript program to which the QP node corresponds. Accordingly, every internal statement or block in SQL 205 is uniquely identified with a QP node. A QP node 217 represents semantics such as and imperative logic for each statement in SQL 205.

Preprocessor 220 translates parse tree 215 into intermediate representation (IR) graph 225 of IR nodes 227 that represents the plan search space of optimizer 230. The IR nodes 227 represent logical unit operations in a SQLScript plan. For example, a SQL statement execution is represented as an ir_statement in an IR graph, and a block statement for imperative logic is represented using an ir_basicblock. IR graph 225 is then input to optimizer 230, which uses transformation rules 234 to transform IR graph 225 to another IR graph 235.

Next, optimizer 230 uses enumeration rules 238 to enumerate several IR graphs 245 based on IR graph 235. An IR graph 255 is selected from IR graphs 245 and passed to code generator 250. Code generator 250 generates SQLScript Execution Engine (SE) code based on the optimized IR graph 255.

Figure 3:
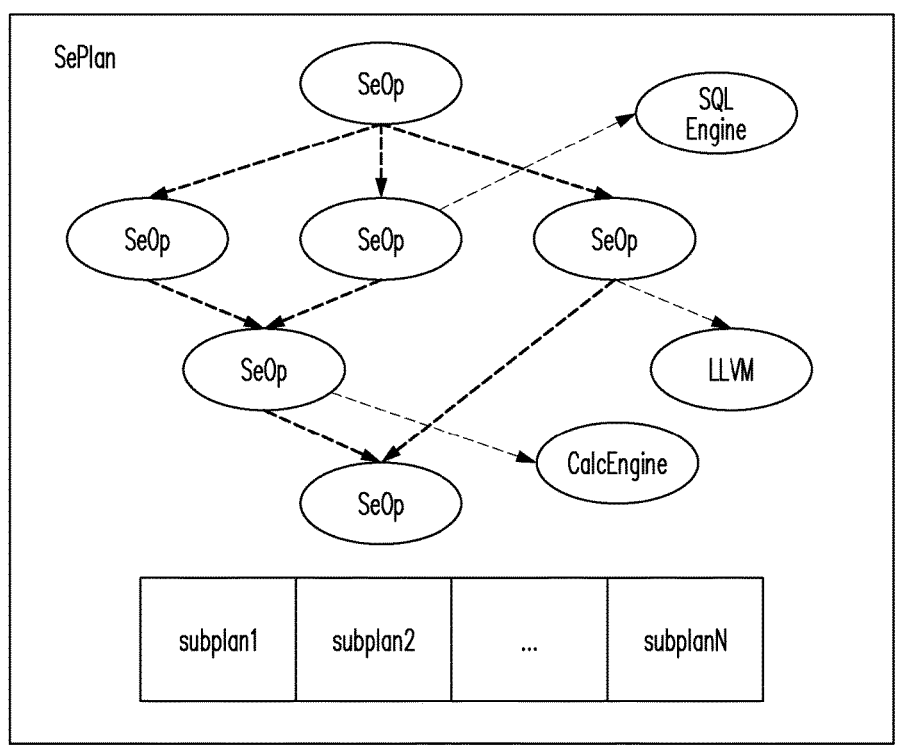
FIG. 3 is a diagram illustration execution of operations according to some embodiments.

As illustrated in FIG. 3, the SE code may comprise a C++ operator graph that can be evaluated by an SQL engine. The SE code (plan) itself is also represented as a graph of SE operators. An SE operator represents a physical unit of SQLScript execution consuming CPUs and memory for algorithm evaluation. An SE operator (SeOp) may contain an algorithm or a wrapper function call to involve other engines in plan evaluation. Imperative logic such as branches, loops, exception handlings are executed in an SE operator, and SQL statements (e.g. SELECT, INSERT, UPDATE, DELETE, . . . ) are indirectly executed via the SQL engine. During SQLScript execution, there is at least one running SE operator, or multiple SE operators to evaluate a program block in parallel.

The following table includes descriptions of IR nodes and SE operators according to some embodiments.

| Operator | Description |
| --- | --- |
| qp_select, qp_update, qp, delete | select statement, update statement, delete statement |
| qp_proc_for, qp_proc_if | Imperative logic such as for, if |
| qp_proc_var | declarative statement |
| qp_proc_call | call statement for calling the other SQLScript |
| ir_statement | statement to apply transformation rules for each single assignment |
| ir_basicblock | block statement to apply transformation rules for imperative logic |
| se_op_qe | statement to execute the SQL statement |
| se_op_l | block statement to execute the imperative logic |

A brief description of SQLScript now follows. SQLScript provides two primary extensions, which will be referred to herein as the functionality extension and the procedural extension.

The functional extension of SQLScript supports the declaration of declarative SQL statements with table variables or user-defined table functions. For example, a single assignment s=(v, q) is used to bind the result of SQL statement q to a table variable v or a scalar type such as integer, decimal, char, and so on. The table variable used for tabular data structure is either determined from the SQL statement or declared explicitly. The variable name is prefixed by the colon (:) in the variable reference.

As illustrated in the SQLScript program string below, a SELECT statement can be assigned to a table variable and the table variable can be used in the FROM clause of other SQL statement. Two or more SQL statements can be in-lined into a single statement and executed at once, or executed separately in parallel if there is no data dependency among SQL statements. The SQLScript optimizer described with respect to FIG. 2 makes the decisions for statement in-lining and parallel execution considering SQL query characteristics, e.g. table size estimation, filter selectivity, and resource status such as available CPU cores and memory. Transformations based on statement inlining and call flattening are now described.

```
 1 CREATE PROCEDURE tpc_ds_n1(in store_name
       nvarchar(50), out t_res
       store_sales_with_store)
 2 AS BEGIN
 3   DECLARE v_f_id nvarchar(50);
 4   IF :store_name = 'Jet' THEN
 5     v_f_id := 'Walmart';
 6   END IF;
 7   stores = SELECT * FROM store s,
           store_sales ss WHERE s.s_store_sk =
           ss.ss_store_sk;
 8   t_res = SELECT * FROM :stores WHERE
           s_store_name = :v_f_id or
           s_store_name = 'cally';
 9 END;
10 CREATE PROCEDURE tpc_ds_n2(in store_name
       nvarchar(50))
11 AS BEGIN
12   CALL tpc_ds_n1(:store_name, :result);
13   count = SELECT count(*) FROM :result WHERE
           ss_ext_wholesale_cost > 9800.0;
14 END;
```

SQL inlining: Given two single assignments $s_1=(v_1, q_1)$ and $s_2=(v_2, q_2)$; if $q_2$ refers to $v_1$, SQL inlining replaces the two single assignments to a new single assignment $s_3=(v_2, q_3)$, where $q_3$ is generated by substituting the reference of $v_1$ in $q_2$ to the SQL statement $q_1$. In this case, $q_1$ and $q_2$ are referred to as a child statement and a parent statement, respectively. The query plan of $q_3$ can be optimized by the single query optimizer. Various optimization rules such as join reordering, predicate push down, group by simplification, etc. can be applied since $q_3$ contains all the relational operators of $q_1$ and $q_2$.

Call Flattening: Flattening a SQLScript describes unfolding the body of the callee SQLScript into the body of the caller SQLScript. An output table parameter of a SQLScript can be an input of other SELECT statement. For example, in the SQLScript above, the result of tpc_ds_n1 is referenced in the next SELECT statement. By flattening nested SQLScript calls, the SQLScript optimizer may have more opportunities to apply statement in-lining.

The procedural extension of SQLScript supports the declaration of scalar variables and the use of control flows such as branches, loops, and exit handlers (e.g., WHILE, IF). In addition, both data definition language (DDL) and data manipulation language (DML) are supported. Traditional compiler optimization techniques such as constant propagation, loop invariant motion, control flow simplification, and dead-code elimination are also applied by the SQLScript optimizer. These optimization techniques may improve the performance of SQLScript in terms of execution time and memory usage.

Constant Propagation: In a case that a variable in the statement has a constant value at compile time, the variable is substituted with the value. The substitution is propagated so that variables that refer to the substituted variables are subsequently substituted as well.

Dead Code Elimination: Statements are eliminated if it is guaranteed that their generated results will not be used in the script. Branches are also eliminated if the conditions for branching are evaluated as false after constant propagation.

The above SQLScript string using the store_sales and store tables from TPC-DS. Suppose that the name parameter, which is an input parameter, is 'Jet'. At compile time, the value of input parameter is propagated to all :store_name variables. Then, unnecessary control flow can be removed after applying the propagation. In this example, the branch control flow (lines 4-6 in the above SQLScript) is removed and all the references of v_j_id are again propagated and replaced with 'Walmart'. Further, the body of callee tpc_ds_n1 is embedded into tpc_ds_n2 according to call flattening optimization. Finally, the queries for stores, t_res, and count are in-lined into the single query.

A resulting version of the SQLScript string, optimized as described above, is presented below.

```
1 WITH stores AS (SELECT * FROM store s,
       store_sales ss WHERE s.s_store_sk =
       ss.ss_store_sk),
2      t_res AS (SELECT * FROM :stores WHERE
       s_store_name = 'Jet' or
       s_store_name = 'cally')
3 SELECT count(*) FROM :t_res WHERE
       ss_ext_wholesale_cost > 9800.0;
```

As shown in this example, the compiled SQLScript plan is a single in-lined query execution whereas the original user-provided design-time procedure consisted of two procedure calls, three SQL statements, and several scalar variables and control flows. According to conventional systems, users would see only a single query execution during the run-time of the SQLScript procedure, and could therefore not easily determine correlations between the design-time procedure and the run-time executed query.

Figure 4:
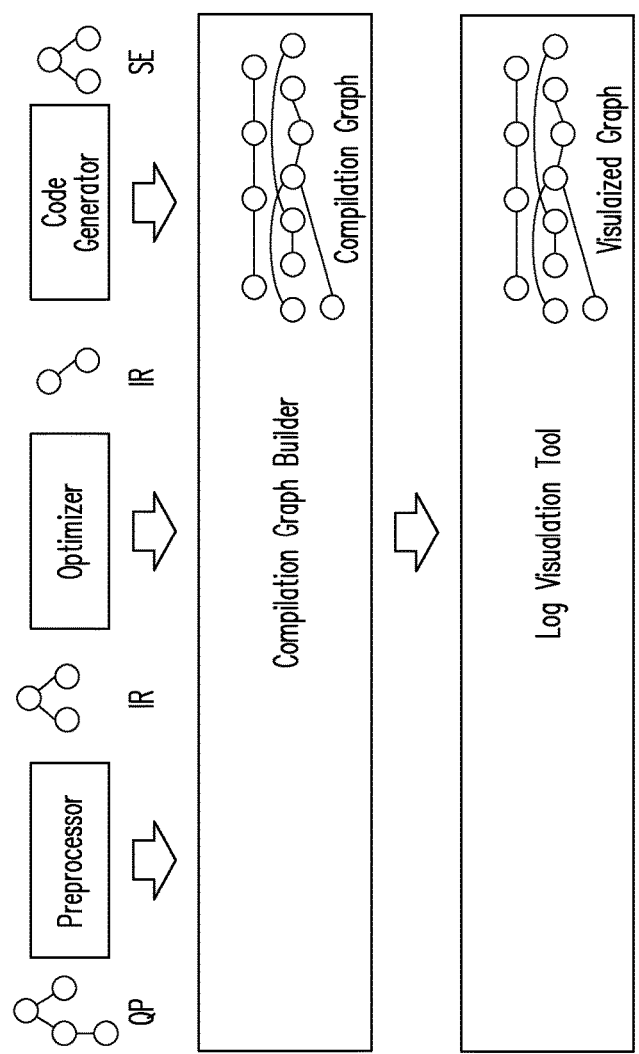
FIG. 4 is a block diagram of a system according to some embodiments.

According to some embodiments, and as illustrated in FIG. 4, a compilation graph builder generates a compilation graph to logically link related nodes which are generated during the compilation process. As illustrated, the compilation graph builder receives information from the preprocessor, optimizer, and code generator to build a compilation graph specifying correspondences between the QP, IR and SE nodes generated by each process. The compilation graph may be provided to a log visualization tool, which generates and presents a visualized graph illustrating the correspondences to a user.

Figure 5:
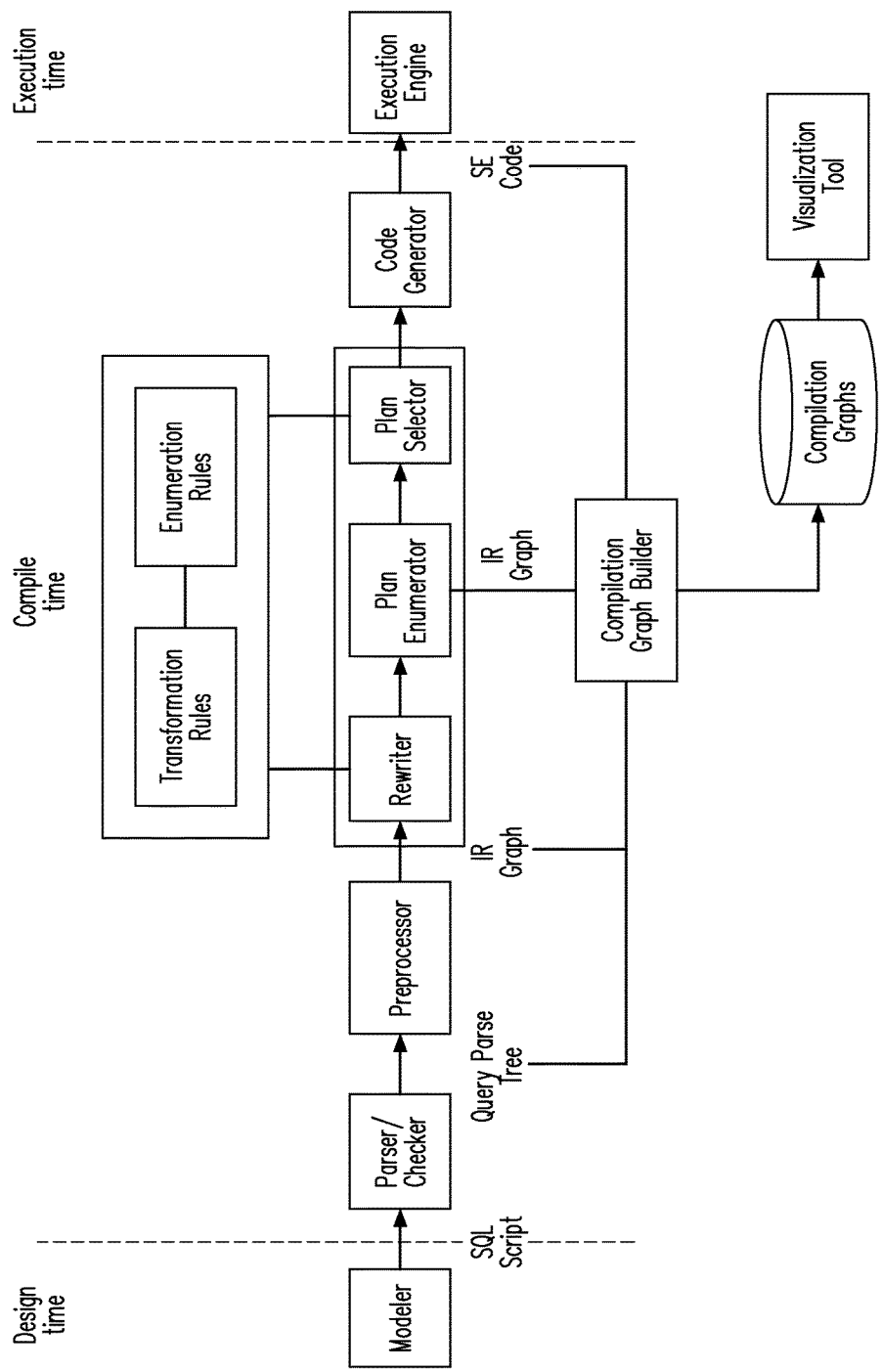
FIG. 5 is a block diagram of a system architecture according to some embodiments.

FIG. 5 illustrates incorporation of the compilation graph builder into the compilation architecture described with respect to FIG. 2 according to some embodiments. During SQLScript compilation, the compilation graph builder receives the Query Parse tree, the initial IR graph, each iteration of the IR Graph during optimization process, and the final SE graph. After completion of compilation, a compilation graph is generated based on the received information. In this regard, reception of each iteration of the IR graph allows the compilation graph builder to track the correspondences between IR nodes of each iteration, thereby allowing tracking from each of the initial QP nodes through to the final SE nodes. Compilation graphs may be stored and thereafter visualized using a visualization tool as described above.

Generation of the compilation graph according to some embodiments will now be described. For purposes of the description, the compilation graph may be represented by a 4-tuple, $G=(V, E, L, l)$, where V is a set of vertices; $E \subseteq V \times V$ is a set of edges; L is a set of labels, $l: V \cup E \rightarrow L$; and l is a function that assigns labels to the vertices and the edges. The vertices are QP nodes, IR nodes, and SE operators. The label of a vertex consists of operator type and statement. The label of an edge is an applied transformation rule between two vertices. The two vertices $v_1$ and $v_2$ are connected by an edge if $v_2$ is generated from $v_1$ by applying a transformation rule.

Figure 6:
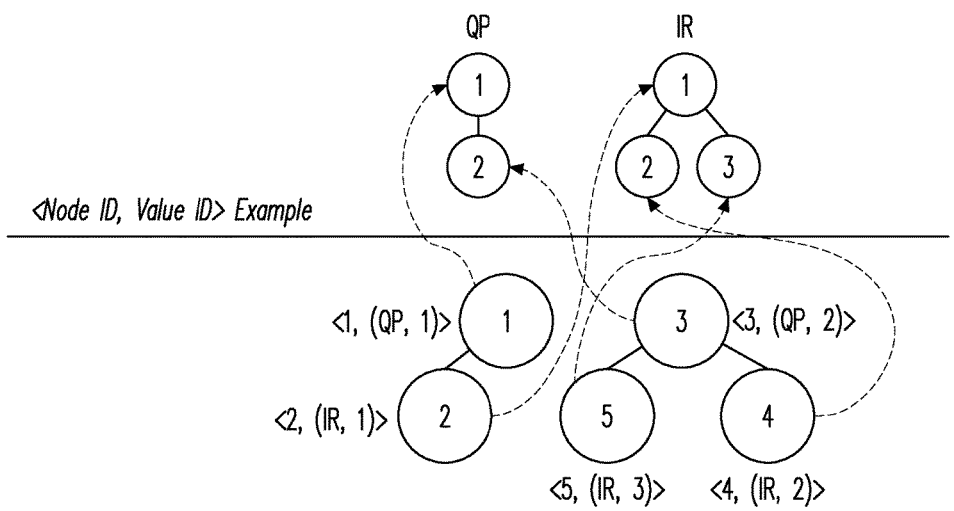
FIG. 6 illustrates graph node ID management according to some embodiments.

The compilation graph builder manages two types of node of IDs according to some embodiments. As illustrated in FIG. 6, Node IDs are generated in increasing order and assigned to each new node added to a compilation graph. The Node ID is used to track the sequence of the graph build process. A node's Value ID uniquely identifies the QP/IR/SE value of the node. Using the Value ID, one may determine the origin of a node and access a corresponding actual memory address.

Figure 7:
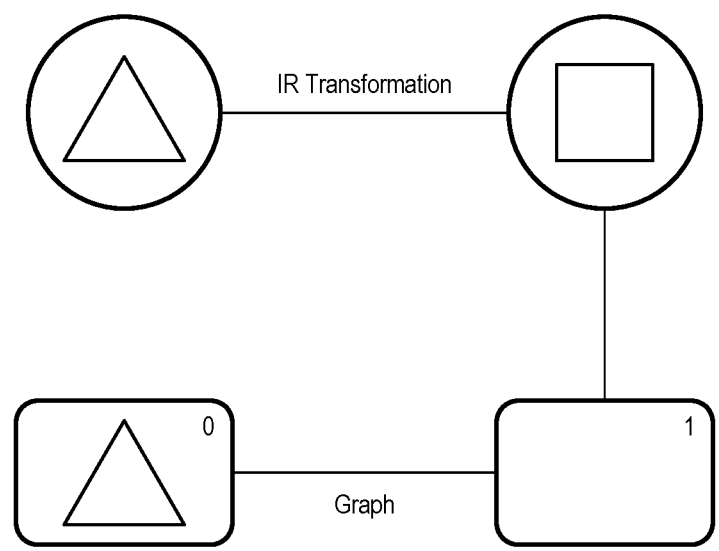
FIG. 7 illustrates a copy-minimum-on-write operation according to some embodiments.

As described above, IR structures may be updated, replaced, or deleted during optimization but IR nodes generated as described herein to reference the original IR structures are not changed in place. A copy-minimum-on-write operation is executed for the IR nodes to efficiently maintain a history of the original IR nodes. Referring to FIG. 7, the original IR structure is changed from a triangle to a rectangle (in place), but the corresponding IR graph node is newly shallow-copied to track the new IR structure (rectangle, version 1) leaving the old IR (triangle, version 0) as-is. To reduce memory space for the rectangle, version 1 does not include a rectangle. After all transformation is complete, a full optimization history of any IR node may be efficiently gleaned by back-tracing all versions of IR nodes.

Figure 8:
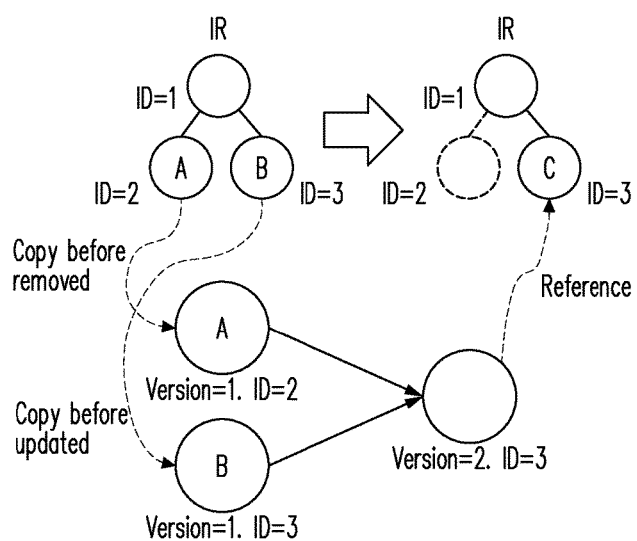
FIG. 8 illustrates graph node version management according to some embodiments.

FIG. 8 illustrates manipulation of the IR nodes of a compilation graph in response to an inlining optimization of a graph of IR structures. To preserve the previous data, the compilation graph builder assigns a version number to all IR nodes, and copies and retains only delta changes resulting from by the transformation. The original IR nodes are not updated.

Figure 9:
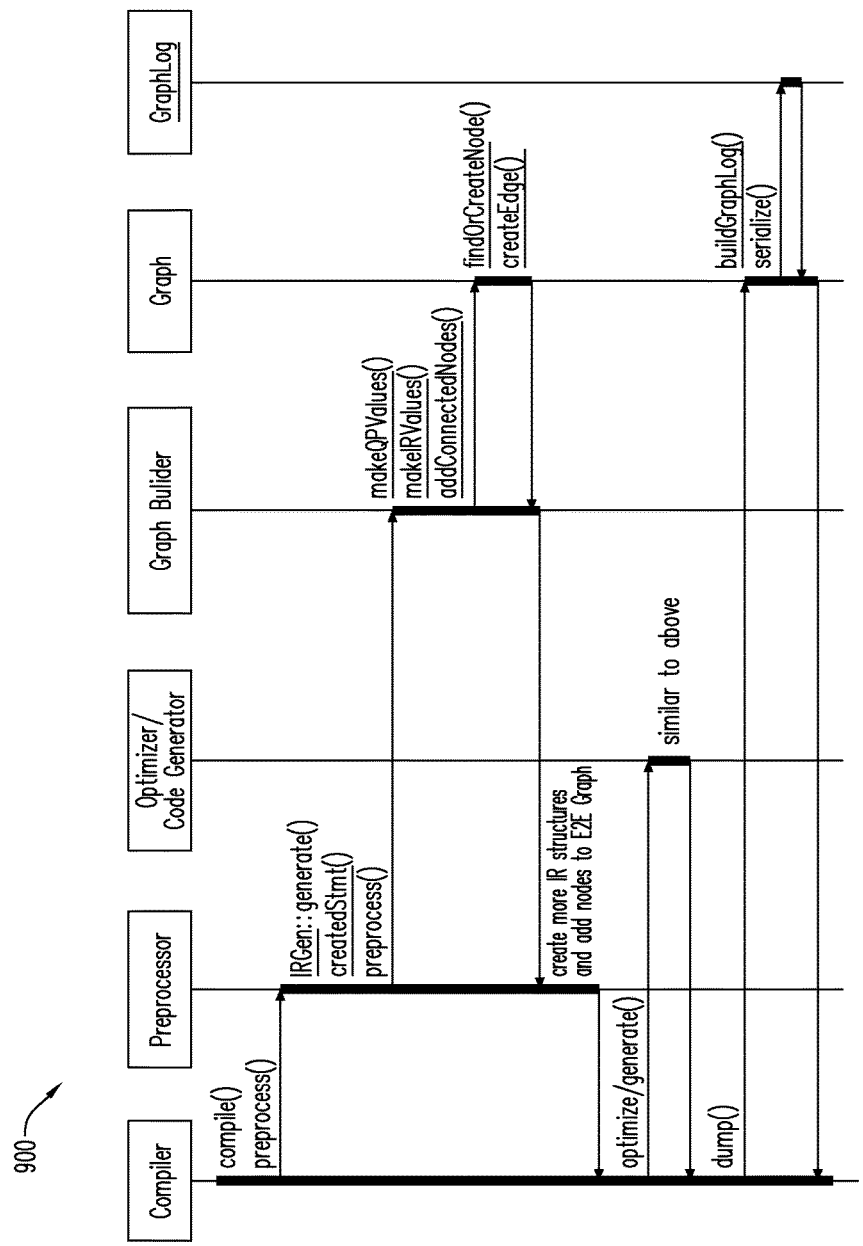
FIG. 9 is a sequence diagram according to some embodiments.

FIG. 9 comprises a diagram of sequence 900 according to some embodiments. Sequence 900 may generate a compilation graph according to some embodiments. In some embodiments, various hardware elements of development system 140 execute program code to perform sequence 900.

In this regard, sequence 900 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

As described above, a QP node includes absolute position information (e.g., the line number and column position number) of a corresponding portion of the original SQLScript definition. As also described above, QP nodes are generated for each internal statement or program block in the input SQLScript program string and formatted into a parse tree. The graph builder generates vertices in the graph (i.e., compilation graph nodes) corresponding to each QP node of the parse tree.

Similarly, compilation graph nodes are generated for each IR node of the initial IR graph generated during pre-processing. The QP nodes and IR nodes generally exhibit one-to-one correspondences, but the QP nodes are static and the IR nodes are designed as more flexible structures for subsequent optimizer transformations. The compilation graph builder then defines edges to link the QP compilation graph nodes to the corresponding IR compilation graph nodes.

For each subsequent optimizer transformation of the IR graph, a version number is recorded in the compilation graph. Each IR compilation graph node contains its own version number and a transformed statement, where the version number indicates the number of transformations applied. A new IR compilation graph node is created with an increased version number whenever a transformation rule is applied to an IR graph node. For example, if an IR compilation graph node including version number 1 is transformed twice (e.g. constant-propagated and then in-lined with another statement), the resulting transformed IR compilation graph node includes version number 3.

At code generation time, the code generator creates an SE code, which is a graph of SE operators, based on the final optimized IR graph. An SE operator is a unit of physical execution code generated from one or more IR nodes. For example, an SQL statement may be mapped to the se_op_qe operator, whereas the se_op_l operator can be generated from multiple IR nodes containing expressions, loop variables, etc. The compilation graph builder generates a vertice (i.e., an SE compilation graph node) for each SE operator and reflects the mappings between corresponding IR and SE compilation graph nodes using edges as described above. As a result, the compilation graph includes heterogeneous QP and IR nodes and SE operators.

Figure 10A:
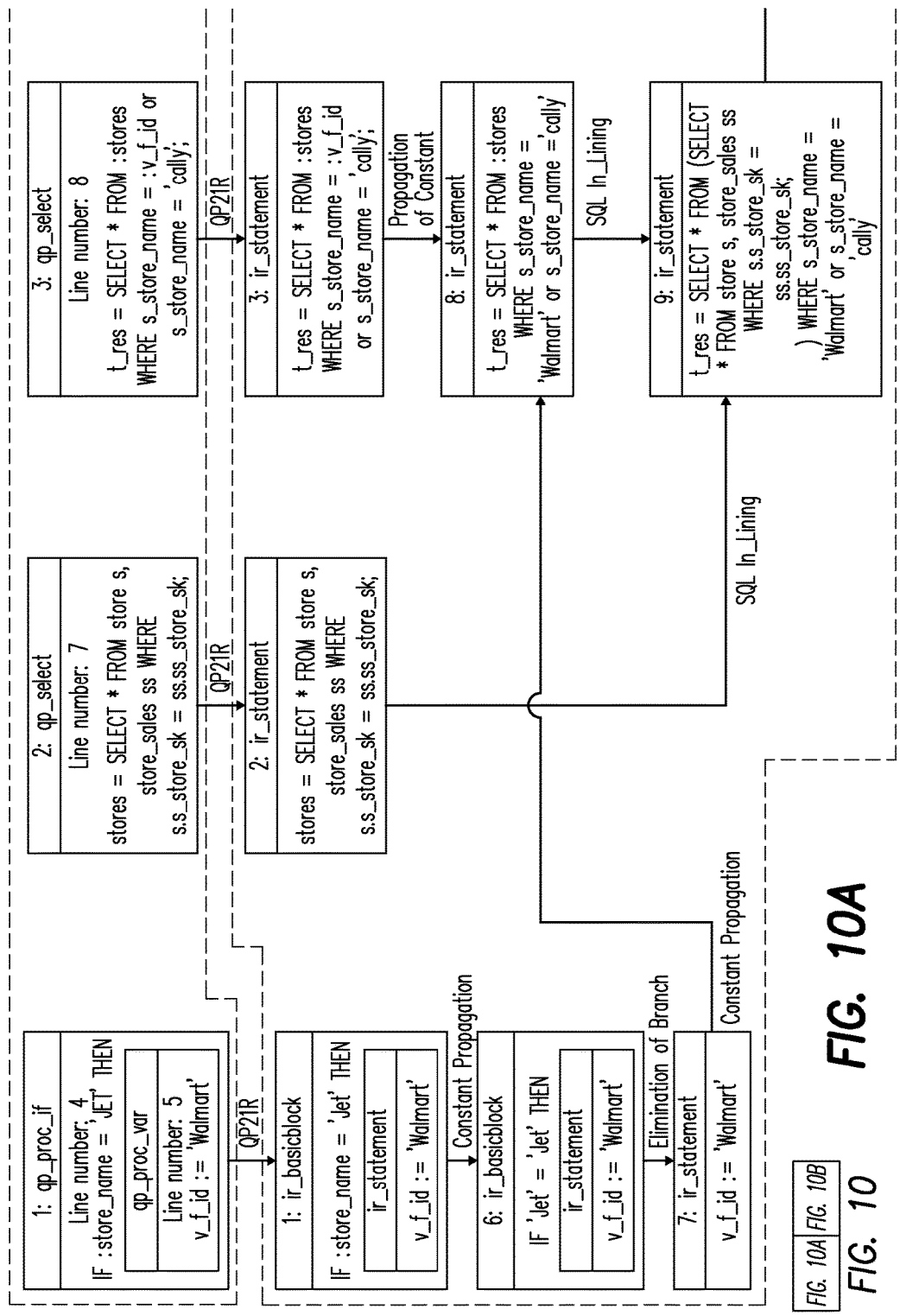
FIGS. 10A and 10B illustrate a compilation graph according to some embodiments.
Figure 10B:
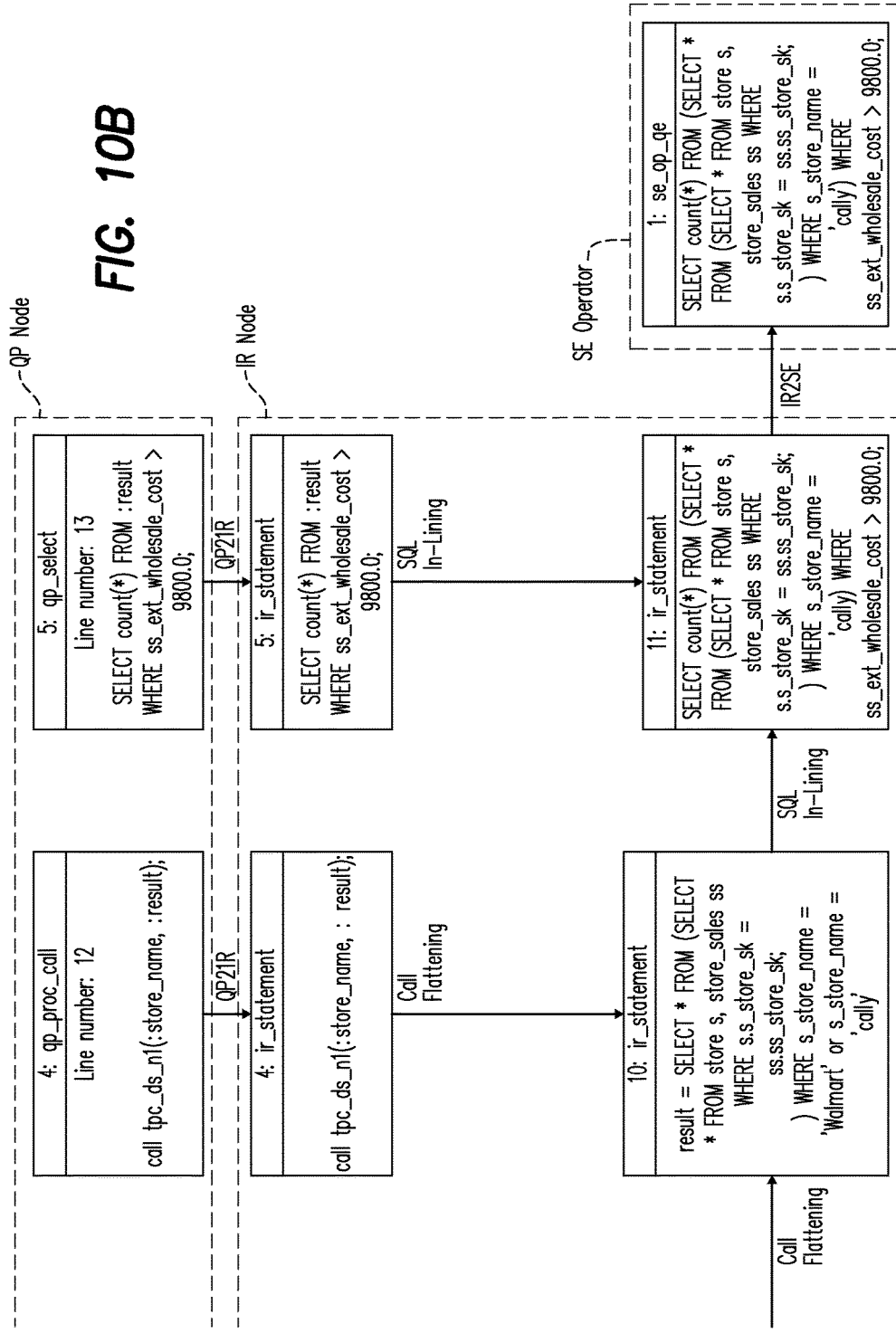

FIGS. 10A and 10B illustrate an example of a compilation graph corresponding to compilation of the SQLScript procedure definition presented above. In the first level, five QP nodes are generated based on the SQLScript procedure definition, which is the design-time object. The QP nodes are then translated to five IR nodes, IR 1 to IR 5. These IR nodes are optimized using constant propagation (IR 6 and 8), dead code elimination (IR 7), statement in-lining (IR 9 and 11), and call flattening (IR 10).

In particular, from IR 1, the input parameter store_name='Jet' is propagated to variable store_name in 'if' statement, generating IR 6. The 'if' statement is eliminated by dead code elimination, generating IR 7. v_f_id='Walmart' at IR 7 is also propagated to t_res variable, generating IR 8. stores in IR 2 and t_res in IR 8 are in-lined in IR 9. Then the call flattening transformation rule creates IR 10 by replacing the call statement in IR 4 with the SQL statement of IR 9. The table variable result in IR 5 is in-lined using the definition in IR 10, generating IR 11. Finally, an SE operator is generated from the statement in IR 11.

As shown, a compilation graph may also provide a comprehensible overview of how each transformation rule changes the IR plan (and the resulting SE code), thereby assisting developers in efficiently identifying a specific node or edge which may be related to an error.

The compilation graph may be generated as a neutral representation of graph structures (e.g., a GraphLog), and serialized for display by a visualization tool. Using GraphLog, for example, a developer is able to add nodes and edges to create a graph representation, and serialize the graph representation to a desired format (e.g., xml, json, dot, and plv) without understanding the grammar of that format.

According to some embodiments, array/hash indexing is used for QP, IR, and SE nodes. For example, IR[2] or SE[6] should return the pointer of a specific IR or SE. To uniquely identify a QP/IR/SE node, a dedicated prefix is used for each phase, e.g., IR[2]→200002.

In some embodiments, the compilation graph lifecycle may be tied to the lifecycle of the design-time object (e.g., the SQLScript string). While the procedure runs, the design-time object is stored in the plan cache and the compilation graph is generated contemporaneously. If the design-time object is deleted, the compilation graph is also deleted.

Figure 11:
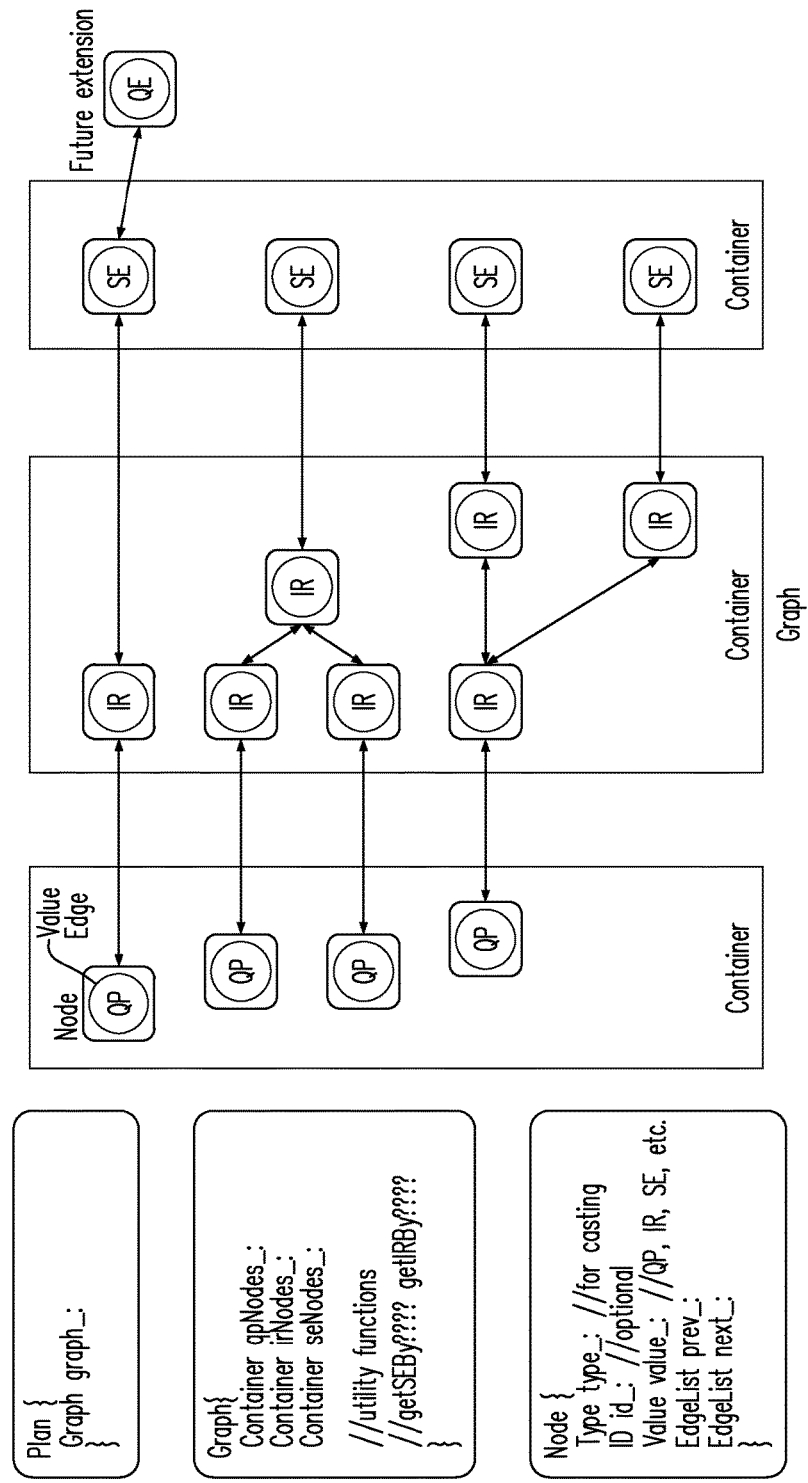
FIG. 11 illustrates an extensible architecture according to some embodiments.

As shown in FIG. 11, the compilation graph can be extended to single query evaluation. The graph may include a generic container object (GraphNode) and support bi-directional links to any other structures. Other engine operators such as QE, JE, CE, and OE can also be linked to specific SE operators.

Figure 12:
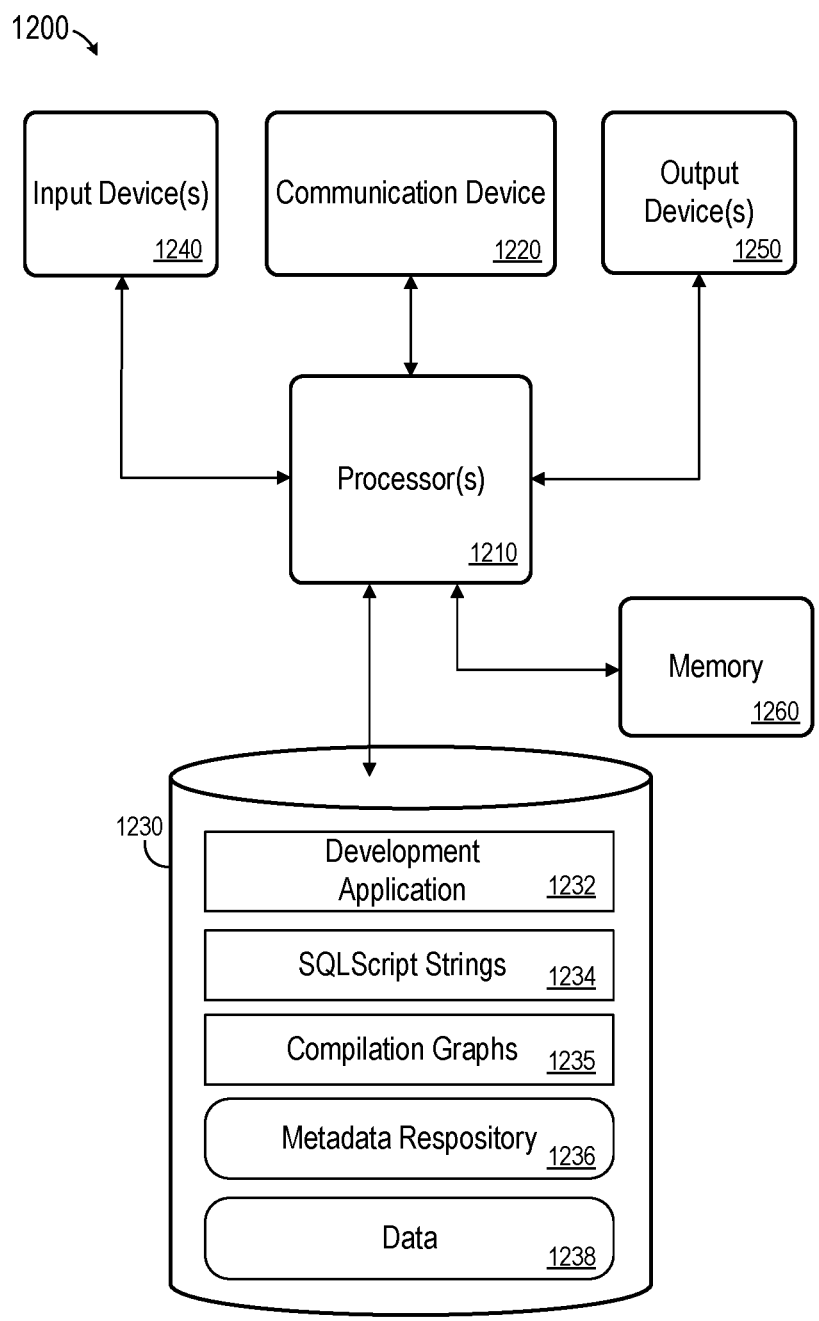
FIG. 12 is a block diagram of a computing system according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise an implementation of development system 140 of FIG. 1 in some embodiments. Apparatus 1200 may include other unshown elements according to some embodiments.

Apparatus 1200 includes processor(s) 1210 operatively coupled to communication device 1220, data storage device 1230, one or more input devices 1240, one or more output devices 1250 and memory 1260. Communication device 1220 may facilitate communication with external devices, such as a computer network or a data storage system. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM), Storage Class Memory (SCM) or any other fast-access memory.

Development application 1232 may comprise program code executed by processor(s) 1210 to cause apparatus 1200 to perform any one or more of the processes described herein. Embodiments are not limited to execution of these processes by a single apparatus.

SQLScript strings 1234 may comprise design-time object representing procedures to be compiled and executed. SQLScript strings 1234 may be created by developers via development application 1232. Compilation graphs 1235 may comprise compilation graphs generated from one or more of SQLScript strings 1234 as described above.

Metadata repository 1236 may comprise an implementation of metadata repository 150 described above. Data 1238 may comprise data store 110, of which a cached portion or full version may be replicated in memory 1260. Data 1238 may therefore include offline scripts automatically generated in an offline-executable language as described above, which are synchronized to offline-enabled clients as also described above.

Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable process steps;
   a processor to execute the processor-executable process steps to cause the system to:
   determine a script definition;
   identify a plurality of portions of the script definition;
   generate a plurality of query parse nodes, each of the plurality of query parse nodes corresponding to a respective one of the plurality of portions of the script definition;
   generate an intermediate representation node corresponding to a respective one of each of the plurality of query parse nodes, wherein an intermediate representation node represents a logical operation corresponding to the portion of the script definition of the query parse node which corresponds to the intermediate representation node;
   define first links between each of the plurality of query parse nodes and its corresponding the intermediate representation node;
   determine an optimizer transformation executed on a first one or more of the intermediate representation nodes;
   generate an intermediate representation node corresponding to the transformed first one or more of the intermediate representation nodes;
   define second links associating the intermediate representation node corresponding to the transformed first one or more of the intermediate representation nodes with the transformed first one or more of the intermediate representation nodes;
   generate a script execution node corresponding to a second one or more of the intermediate representation nodes, where the script execution node comprises a unit of execution code;
   define a third link associating the script execution node with the second one or more of the intermediate representation nodes;
   generate a graph illustrating the plurality of query parse nodes, the intermediate representation nodes, the first links connecting each of the plurality of query parse nodes and its intermediate representation nodes, the second links connecting the intermediate representation node corresponding to the transformed first one or more of the intermediate representation nodes with the transformed first one or more of the intermediate representation nodes, the script execution node and the third link connecting the script execution node with the second one or more of the intermediate representation nodes; and display the graph.

2. A system according to claim 1, the processor to execute the processor-executable process steps to cause the system to:
  determine a second optimizer transformation executed on a third one or more of the intermediate representation nodes;
  generate an intermediate representation node corresponding to the transformed third one or more of the intermediate representation nodes;
  define fourth links associating the intermediate representation node corresponding to the transformed third one or more of the intermediate representation nodes with the transformed third one or more of the intermediate representation nodes;
  generate a second script execution node corresponding to a fourth one or more of the intermediate representation nodes, where the second script execution node comprises a second unit of execution code; and
  define a fifth link associating the second script execution node with the fourth one or more of the intermediate representation nodes.

3. A system according to claim 1, wherein the optimizer transformation comprises at least one of constant propagation, call flattening, in-lining, and branch elimination,
  and wherein the second optimizer transformation comprises at least one other one of constant propagation, call flattening, in-lining, and branch elimination.

4. A system according to claim 1, wherein the optimizer transformation comprises at least one of constant propagation, call flattening, in-lining, and branch elimination.

5. A system according to claim 1, wherein generation of the plurality of query parse nodes comprises generation of a query parse node for each internal statement or program block in the script definition.

6. A system according to claim 5, wherein each query parse node comprises absolute position information of its corresponding internal statement or program block in the script definition.

7. A system according to claim 1, wherein the intermediate representation node corresponding to the transformed first one or more of the intermediate representation nodes comprises a version number based on and incremented from version numbers of the first one or more of the intermediate representation nodes.

8. A system according to claim 1, the processor to execute the processor-executable process steps to cause the system to:
  serialize the graph to a log;
  wherein display of the graph comprises generation of a visualization of the log.

9. A computer-implemented method comprising:
  receiving a script definition;
  identifying a plurality of portions of the script definition;
  generating a parse tree comprising a plurality of query parse nodes, each of the plurality of query parse nodes corresponding to a respective one of the plurality of portions of the script definition;
  generating a first intermediate representation tree comprising an intermediate representation node corresponding to a respective one of each of the plurality of query parse nodes, wherein an intermediate representation node represents a logical operation corresponding to the portion of the script definition of the query parse node which corresponds to the intermediate representation node;
  define first links between each of the plurality of query parse nodes and its corresponding the intermediate representation node;
  determine a second intermediate representation tree, the second intermediate representation tree resulting from an optimizer transformation executed on the first intermediate representation tree;
  generate an intermediate representation node corresponding to a transformed first one or more of the intermediate representation nodes of the first intermediate representation tree;
  define second links associating the intermediate representation node corresponding to the transformed first one or more of the intermediate representation nodes with the transformed first one or more of the intermediate representation nodes of the first intermediate representation tree;
  generate a script execution graph of script execution nodes, each of the script execution nodes corresponding to a second one or more nodes of the second intermediate representation tree;
  define third links associating each of the script execution nodes with its corresponding second one or more of the intermediate representation nodes;
  generate a graph illustrating the plurality of query parse nodes, the intermediate representation nodes, the first links connecting each of the plurality of query parse nodes and its intermediate representation nodes, the second links connecting the intermediate representation node corresponding to the transformed first one or more of the intermediate representation nodes with the transformed first one or more of the intermediate representation nodes, the script execution nodes and the third links associating each of the script execution nodes with its corresponding second one or more of the intermediate representation nodes; and
  present the graph.

10. A method according to claim 9, wherein the optimizer transformation comprises at least one of constant propagation, call flattening, in-lining, and branch elimination,
  and wherein the second optimizer transformation comprises at least one other one of constant propagation, call flattening, in-lining, and branch elimination.

11. A method according to claim 9, wherein generation of the parse tree comprising the plurality of query parse nodes comprises generation of a query parse node for each internal statement or program block in the script definition.

12. A method according to claim 11, wherein each query parse node comprises absolute position information of its corresponding internal statement or program block in the script definition.

13. A method according to claim 9, wherein the intermediate representation node corresponding to the transformed first one or more of the intermediate representation nodes comprises a version number based on and incremented from version numbers of the first one or more of the intermediate representation nodes.

14. A method according to claim 9, further comprising:
  serializing the graph to a log,
  wherein presentation of the graph comprises generation of a visualization of the log.

15. A non-transitory computer-readable medium storing processor-executable process steps which, when executed by a processor, cause a computing system to:

determine a script definition;

identify a plurality of portions of the script definition;

generate a plurality of query parse nodes, each of the plurality of query parse nodes corresponding to a respective one of the plurality of portions of the script definition;

generate an intermediate representation node corresponding to a respective one of each of the plurality of query parse nodes, wherein an intermediate representation node represents a logical operation corresponding to the portion of the script definition of the query parse node which corresponds to the intermediate representation node;

define first links between each of the plurality of query parse nodes and its corresponding the intermediate representation node;

determine an optimizer transformation executed on a first one or more of the intermediate representation nodes;

generate an intermediate representation node corresponding to the transformed first one or more of the intermediate representation nodes;

define second links associating the intermediate representation node corresponding to the transformed first one or more of the intermediate representation nodes with the transformed first one or more of the intermediate representation nodes;

generate a script execution node corresponding to a second one or more of the intermediate representation nodes, where the script execution node comprises execution code;

define a third link associating the script execution node with the second one or more of the intermediate representation nodes;

generate a graph illustrating the plurality of query parse nodes, the intermediate representation nodes, the first links connecting each of the plurality of query parse nodes and its intermediate representation nodes, the second links connecting the intermediate representation node corresponding to the transformed first one or more of the intermediate representation nodes with the transformed first one or more of the intermediate representation nodes, the script execution node and the third link connecting the script execution node with the second one or more of the intermediate representation nodes; and display the graph.

16. A non-transitory computer-readable medium according to claim 15, the processor-executable process steps to, when executed by a processor, cause a computing system to:

determine a second optimizer transformation executed on a third one or more of the intermediate representation nodes;

generate an intermediate representation node corresponding to the transformed third one or more of the intermediate representation nodes;

define fourth links associating the intermediate representation node corresponding to the transformed third one or more of the intermediate representation nodes with the transformed third one or more of the intermediate representation nodes;

generate a second script execution node corresponding to a fourth one or more of the intermediate representation nodes, where the second script execution node comprises a second unit of execution code; and define a fifth link associating the second script execution node with the fourth one or more of the intermediate representation nodes.

17. A non-transitory computer-readable medium according to claim 16, wherein the optimizer transformation comprises at least one of constant propagation, call flattening, in-lining, and branch elimination, and wherein the second optimizer transformation comprises at least one other one of constant propagation, call flattening, in-lining, and branch elimination.

18. A non-transitory computer-readable medium according to claim 15, wherein the optimizer transformation comprises at least one of constant propagation, call flattening, in-lining, and branch elimination.

19. A non-transitory computer-readable medium according to claim 15, wherein generation of the plurality of query parse nodes comprises generation of a query parse node for each internal statement or program block in the script definition.

20. A non-transitory computer-readable medium according to claim 15, wherein the intermediate representation node corresponding to the transformed first one or more of the intermediate representation nodes comprises a version number based on and incremented from version numbers of the first one or more of the intermediate representation nodes.

* * * * *